(12) United States Patent
Pitman (10) Patent No.: US 11,252,314 B2
(45) Date of Patent: Feb. 15, 2022

(54) MOBILE TERMINAL WITH DISTAL LENSES AND METHOD OF USING MOBILE TERMINAL TO DETERMINE DISTANCE, RANGE AND DIMENSION OF AN OBJECT

(71) Applicant: James Pitman, Brighton (GB)

(72) Inventor: James Pitman, Brighton (GB)

( * ) Notice: Subject to any disclaimer, the term of this patent is extended or adjusted under 35 U.S.C. 154(b) by 21 days.

(21) Appl. No.: 16/491,644

(22) PCT Filed: Mar. 8, 2018

(86) PCT No.: PCT/GB2018/050590
§ 371 (c)(1),
(2) Date: Sep. 6, 2019

(87) PCT Pub. No.: WO2018/162909
PCT Pub. Date: Sep. 13, 2018

(65) Prior Publication Data
US 2021/0136263 A1 May 6, 2021

(30) Foreign Application Priority Data

Mar. 8, 2017 (GB) ..................................... 1703686
Sep. 13, 2017 (GB) ..................................... 1714716

(51) Int. Cl.
| | |
|---|---|
| *H04N 5/225* | (2006.01) |
| *G06T 7/55* | (2017.01) |
| *H04N 5/232* | (2006.01) |
| *G01C 3/08* | (2006.01) |
| *G01C 3/14* | (2006.01) |

(52) U.S. Cl.
CPC ............. *H04N 5/2254* (2013.01); *G01C 3/08* (2013.01); *G01C 3/14* (2013.01); *G06T 7/55* (2017.01); *H04N 5/2258* (2013.01); *H04N 5/232939* (2018.08)

(58) Field of Classification Search
CPC ........... H04N 5/2254; H04N 5/232939; H04N 5/2258; G01C 3/14; G01C 3/08; G06T 7/55
USPC ........................................................ 348/136
See application file for complete search history.

(56) References Cited

U.S. PATENT DOCUMENTS

| | | | |
|---|---|---|---|
| 6,643,396 B1 | 11/2003 | Hendriks et al. | |
| 6,822,563 B2 | 11/2004 | Bos et al. | |
| 6,897,946 B2 | 5/2005 | Uomori et al. | |
| 8,385,004 B2 | 2/2013 | Hicks | |
| 9,019,420 B2 | 4/2015 | Hurst et al. | |

(Continued)

FOREIGN PATENT DOCUMENTS

| | | |
|---|---|---|
| CN | 106355621 | 1/2017 |
| DE | 4132687 | 4/1993 |

(Continued)

*Primary Examiner* — Marnie A Matt
(74) *Attorney, Agent, or Firm* — Diederiks & Whitelaw, PLC.

(57) ABSTRACT

A mobile terminal is provided that includes a camera configured to capture an image. The mobile terminal also has at least one distal lens disposed remotely from the camera, and a connector connecting the at least one distal lens to the camera. The connector is configured to direct light from the at least one distal lens to the camera. In particular, the connector is arranged to allow the at least one distal lens to move independently with respect to the camera.

18 Claims, 5 Drawing Sheets

(56) References Cited

U.S. PATENT DOCUMENTS

| | | | |
|---|---|---|---|
| 9,654,675 B2 | 5/2017 | Kessler | |
| 10,043,290 B2 | 8/2018 | Hayasaka | |
| 10,092,182 B2 | 10/2018 | Myung et al. | |
| 2006/0133738 A1 | 6/2006 | Marcinkiewicz et al. | |
| 2008/0218611 A1 | 9/2008 | Parulski et al. | |
| 2008/0218612 A1* | 9/2008 | Border | H04N 5/232123 |
| | | | 348/262 |
| 2011/0168876 A1 | 7/2011 | Hsiao et al. | |
| 2013/0265485 A1* | 10/2013 | Kang | G02B 27/0025 |
| | | | 348/360 |
| 2014/0268376 A1 | 9/2014 | O'Neill et al. | |
| 2014/0293043 A1* | 10/2014 | Datta | G06T 5/006 |
| | | | 348/135 |
| 2015/0104076 A1* | 4/2015 | Hayasaka | G01B 11/14 |
| | | | 382/106 |
| 2015/0116699 A1 | 4/2015 | Meek et al. | |
| 2016/0381289 A1* | 12/2016 | Kim | H04N 5/23222 |
| | | | 348/38 |

FOREIGN PATENT DOCUMENTS

| | | |
|---|---|---|
| JP | 2013104986 | 5/2013 |
| KR | 20160040767 | 4/2016 |
| WO | 2013/081264 | 6/2013 |
| WO | 2016/180874 | 11/2016 |

* cited by examiner

MOBILE TERMINAL WITH DISTAL LENSES AND METHOD OF USING MOBILE TERMINAL TO DETERMINE DISTANCE, RANGE AND DIMENSION OF AN OBJECT

CROSS-REFERENCE TO RELATED APPLICATIONS

This application represents the U.S. National Phase of International Application number PCT/GB2018/050590 entitled "Mobile Terminal" filed Mar. 8, 2018, which claims benefit to Great Britain No. 1703686.4 filed Mar. 8, 2017 and Great Britain No. 1714716.6 filed Sep. 13, 2017, all of which are incorporated herein by reference.

The present invention relates to a mobile terminal, such as a smartphone. In particular, the present invention relates to a method of determining a distance using a mobile terminal.

BACKGROUND TO THE PRESENT INVENTION

In the present disclosure, mobile terminals may include mobile telephones, smartphones, tablets, laptop computers, smart watches, etc.

Conventionally, cameras on mobile terminals are provided at fixed positions, and a user must move the mobile terminal in order to position and point a camera on the mobile terminal to face the subject for which an image is to be captured. If the user wants to take a photograph or video of him/herself (a "selfie") or a subject behind, the user must rotate the mobile terminal so as to point the camera in the desired direction.

More recently, mobile terminals are provided with both front- and rear-facing cameras respectively on the front and the back of a terminal. This allows the user to take a "selfie" without rotating the mobile terminal. However, providing two cameras increases the manufacturing cost of the mobile terminal. Therefore, a camera that is of a lower quality or resolution is generally provided on the user-facing side of a terminal so as to reduce costs.

Mobile terminals such as smartphones are capable of determining distances using GPS technology provided on the terminals. This method is limited by the accuracy of commercial GPS and the availability of GPS mapping of the terrain. Higher accuracy GPS is available for military applications and can be further enhanced by multi-frequency systems and augmentation technologies, but this is generally not available to the public.

Distances can be accurately determined using laser in a laser distance meter. However, such systems are expensive and powerful lasers require special precautions, and therefore not suitable for general use.

Stadiametric rangefinding is a technique of measuring distances with a telescopic instrument. The method relies on either knowing the range to an object to determine the dimension of the object, or knowing the dimension of the object to determine the range. If neither the range to the object or the dimension of the object is known, this method cannot be used.

Other active rangefinding methodologies exist including sonar, ultrasound, radar, etc., with varying degrees of accuracy, which are unsuitable for general use.

In view of the foregoing, it is desirable to provide an improved mobile terminal and an improved method of determining a distance using a mobile terminal.

SUMMARY OF THE PRESENT INVENTION

In embodiments of the present invention, a mobile terminal is provided that comprises a camera configured to capture an image. The mobile terminal further comprises a first distal lens and a second distal lens disposed remotely from the camera, and a connecting means that connects the first and second distal lenses to the camera, the connecting means being configured to direct light from the first and second distal lenses to the camera. In particular, the connecting means comprises a first optical fibre connecting the first distal lens to the camera and a second optical fibre connecting the second distal lens to the camera, and is arranged to allow the first and second distal lenses to move independently with respect to the camera.

According to the embodiments, since the distal lens is able to move independently from the camera, a user may direct the distal lens at the subject for which an image is to be captured without moving the mobile terminal itself. For example, the user may follow the subject by continuously rotating the distal lens to redirect the distal lens towards the subject while capturing one or more still images or videos. The embodiments thus enable the user to continuously monitor the image of the subject on a screen on the mobile terminal. In preferred embodiments, it is possible to direct the distal lens at different angles with respect to the surface of the mobile terminal, thus making it more convenient for the user to capture images.

In a preferred embodiment, at least a part of the connecting means is articulated and/or flexible. This enables the at least one distal lens to move freely and reduces the likelihood of causing stress and/or tension to the camera as the distal lens is being positioned by a user.

The at least one distal lens may be moved manually by a user, but in a preferred embodiment, the mobile terminal comprises control means configured to control the movement of the at least one distal lens. The control means may be provided in any suitable and desirable form. For example, the control means may be a mechanical control, or it may be electrically connected to the at least one distal lens and controls the movement of the distal lens electrically.

In the preferred embodiment, the first distal lens may be disposed on a first surface of the mobile terminal while the second distal lens may be disposed on a second surface of the mobile terminal. Preferably, the first surface is a front surface of the mobile terminal and the second surface is a rear surface of the mobile terminal. Other surfaces are contemplated such as the top edge surface, bottom edge surface and the side edge surfaces. According to the preferred embodiment, it is possible to capture images both in front of and behind a user using a single camera without the need to turn the mobile terminal. Since only a single camera is required, a high resolution camera may be employed. Thus, compared to a mobile terminal having a front and a rear facing camera, the manufacturing cost is reduced without sacrificing resolution.

The mobile terminal may be configured in any suitable way such that the camera receives light from the desired distal lens or lenses. In a preferred embodiment, the mobile terminal further comprises a switching means that is configured to switch a source of light being directed to the camera between the first distal lens and the second distal lens.

The switching means may be disposed at any suitable and desirable position. In an embodiment, the switching means is disposed at the camera. In another embodiment, the switching means is alternatively or additionally disposed at each of the first and second lenses.

The switching means may be controlled in any suitable and desirable way. For example, the switching means may be a mechanical switch operable on a surface of the mobile terminal, which physically blocks the input from one distal lens and allows the input from another lens to reach the camera. In a preferred embodiment, the switching means is controlled electronically, for example using an electrically switchable reflective device controlled, e.g., by an app or a switch provided on a surface of the mobile terminal.

The camera may be disposed at any position on or within the mobile terminal as desired. For example, the camera may be disposed at the conventional position on the front or rear surface at the top of the mobile terminal. However, the use of one or more distal lenses in combination with the connecting means allows the camera to be disposed at positions conventionally considered to be inconvenient for capturing images. Thus, in a preferred embodiment, the camera is disposed within the body of the mobile terminal, making it possible to protect the camera from e.g. impact, dust and rain, etc.

In a preferred embodiment, the camera is disposed within and perpendicular to the plane of the mobile terminal. This therefore provides space for accessories, such as one or more filters and/or one or more additional lenses, to be disposed to support additional functions for the camera.

In preferred embodiments, the one or more distal lenses are mounted on a surface of the mobile terminal in such a way to allow rotational movement of a distal lens. However, in some embodiments, one or more distal lenses may be detachably mounted on the mobile terminal, and the connecting means may be configured to be extendable to allow the one or more distal lenses to be extended from the mobile terminal. An extendable distal lens enables image capturing in discrete and/or in restricted spaces, thus providing additional flexibility.

Embodiments of the present invention provide a method of determining a distance using a mobile terminal. The mobile terminal comprises first and second distal lenses disposed spaced apart by a predetermined distance on the same surface of the mobile terminal. The first and second distal lenses are each connected to a camera by a respective connecting means, e.g. an optical fibre. The method comprises capturing, by the camera, a first image of an object from the first distal lens; capturing, by the camera, a second image of the object from the second distal lens; comparing the first image with the second image; and determining a distance in relation to the object based on a result of comparing the first image with the second image using the predetermined distance.

In another aspect, embodiments of the present invention provide a mobile terminal comprising a camera configured to capture an image; first and second distal lenses disposed spaced apart by a predetermined distance on the same surface of the mobile terminal; connecting means provided to each of the first and second distal lenses, the connecting means connecting each distal lens to the camera and configured to direct light from each distal lens to the camera; and processing means configured to compare an image of an object captured via the first distal lens with an image of the object captured via the second distal lens, and determine a distance in relation to the object based on the comparison using the predetermined distance between the two distal lenses.

According to preferred embodiments, two distal lenses separated by a predetermined, known, distance are provided on the same surface of the mobile terminal. Each distal lens is connected to a single camera such that an image can be taken by the mobile terminal from two different viewpoints using only one camera. Each image captured from each distal lens correspond to a different line of sight from the mobile terminal to an object that is the focus of the image. The object therefore would appear to have shifted with respect to the second image when compared to the first image. Comparing the first image with the second image provides information of the difference in the two lines of sight, and with the known predetermined distance between the two distal lenses, thus the distance separating the two lines of sight, it is possible to determine a distance in relation to the object, for example a range between the mobile terminal (thus the user) to the object, and/or a dimension of the object. Preferred embodiments therefore enables a user to determine a distance in relation to an object that does not rely on the availability of a third-party service such as GPS, in a way that is inexpensive and easily portable.

In preferred embodiments of the method, comparing the first image with the second image comprises determining an angle of convergence between the first image and the second image. The angle of convergence is an angle between a first line of sight to the object with respect to the first distal lens and a second line of sight to the object with respect to the second distal lens. The angle of convergence may be determined using any suitable method.

In preferred embodiments, the method further comprises selecting a reference point on the object in the first image; and identifying the reference point on the object in the second image. The step of comparing the first image with the second image may then comprise detecting a difference between a first position of the reference point within the first image and a second position of the reference point within the second image. In an embodiment of the method, the step of comparing the first image with the second image further comprises determining an angle of convergence using the detected difference between the first position and the second position. According to the embodiments, a reference point on the object in the first image may be automatically selected by a processing means of the mobile terminal, or it may be selected by the user. Similarly, the same or corresponding reference point on the object in the second image may be identified by the processing means or manually by the user.

In preferred embodiments of the method, determining a distance in relation to the object comprises determining a range from the mobile terminal to the object. The range may be determined using any suitable method as desired. In an embodiment, the range is determined by trigonometry using the known predetermined distance between the first and second distal lenses and the determined angle of convergence.

In preferred embodiments of the method, a final range from the mobile terminal to the object is determined by averaging two or more results. In particular, the final range is determined by determining a second (and subsequent) range from the mobile terminal to the object using the predetermined distance and a second (and subsequent) angle of convergence determined by comparing a third (and subsequent) image of an object captured by the camera from the first distal lens with a fourth (and subsequent) image of the object captured by the camera from the second distal lens, and averaging the first range and the second (and subsequent) range. By averaging two or more results, it is possible to improve the accuracy of the final range determined by the method.

In preferred embodiments of the method, the step of determining a distance in relation to the object further comprises determining a dimension of the object based on the determined range from the mobile terminal to the object.

In an embodiment, determining the dimension of the object comprises selecting, in one of the first image or the second image, a first point on the object and a second point on the object spaced from the first point; determining a difference between the first point and the second point within the first or second image; and determining the dimension of the object based on the determined difference between the first point and the second point. The selection of a first point and a second point on the object in either the first or the second image may be performed by the processing means of the mobile terminal, or it may be performed manually by the user, as desired. The first point and the second point may be any points on the object spaced apart from each other in any direction, for example, the first point may be a top corner of an object and the second point may be a bottom corner of the object. The determining of a difference between the first point and the second point within the image may be a difference between their positions within the image, for example, measured by the number of pixels between the two points and the pixel pitch.

In an embodiment, a second dimension of the object is determined based on the determined range from the mobile terminal to the object. The second dimension may be orthogonal to the previously determined dimension or at other angles to the previously determined dimension, as desired.

In an embodiment, the second dimension of the object is determined by selecting, in one of the first image or the second image, a third point on the object and a fourth point on the object spaced from the third point; determining a difference between the third point and the fourth point within the first or second image; and determining the second dimension of the object based on the determined difference between the third point and the fourth point.

In an embodiment, the method further comprises generating a scale grid based on the determined dimension of the object. The scale grid may be generated using one or more determined dimension(s) of the object. The scale grid may be used in many different ways, for example, for quickly reading off the size of different parts of the object, for comparing with the size of another object, etc.

In an embodiment, the generated scale grid may be embedded in the first image or the second image.

In an embodiment, the first image or the second image may be stored with the embedded scale grid in a predetermined format. The stored image may, for example, be shared with another party with the scale grid embedded, and/or be rescaled for other purposes whereby the grid may be scaled in direct proportion to the image of the object.

In an embodiment, the generated scale grid may be superimposed on the first image or the second image and displayed on a screen of the mobile terminal.

Further embodiments provides a mobile terminal comprising first and second cameras. Each camera is configured to capture an image, the first and second cameras being disposed spaced apart by a predetermined distance on the same surface of the mobile terminal. The mobile terminal further comprises processing means configured to compare an image of an object captured by the first camera with an image of the object captured by the second camera, and determine a distance in relation to the object based on the comparison using the predetermined distance.

It will be clear to a skilled person that other optional or alternative features are possible. For example, more than two distal lenses and/or cameras may be provided to a mobile terminal. Embodiments have been contemplated in which three, four or more distal lenses are provided on the same surface of a mobile terminal, each connected to a single camera within the body of the mobile terminal by respective optical fibre or other connection. Embodiments have also been contemplated in which multiple distal lenses are provided on multiple surfaces of a mobile terminal. Further embodiments have been contemplated in which a combination of multiple distal lenses and multiple cameras are provided to a mobile terminal.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENT

In preferred embodiments of the present invention, a mobile terminal is provided, which comprises a camera, such as a digital camera, configured to capture images. Images may include one or both of still images, e.g. photographs, and/or moving images, e.g. videos. The mobile terminal further comprises at least one distal lens that is disposed remotely, at a distance, from the camera, the at least one distal lens being connected to the camera via a connecting means, which directs light from the distal lens to the camera. The connecting means is arranged in such a way so as to enable the at least one distal lens to move independently with respect to the camera.

According to the preferred embodiments, since the connecting means and the distal lens are arranged to allow the distal lens to move independently from the camera, a user may rotate the distal lens to direct it at the subject for which an image is to be captured without the need to move the mobile terminal itself. For example, the user may follow the subject by continuously rotating the distal lens to redirect the distal lens at the subject while capturing a sequence of still images or moving images. The preferred embodiment thus enable the user to continuously monitor the image of the subject on a screen on the mobile terminal. According to the preferred embodiments, it is possible to direct the distal lens at different angles with respect to the surface of the mobile terminal, thus making it more convenient for the user to capture images.

Figure 1:
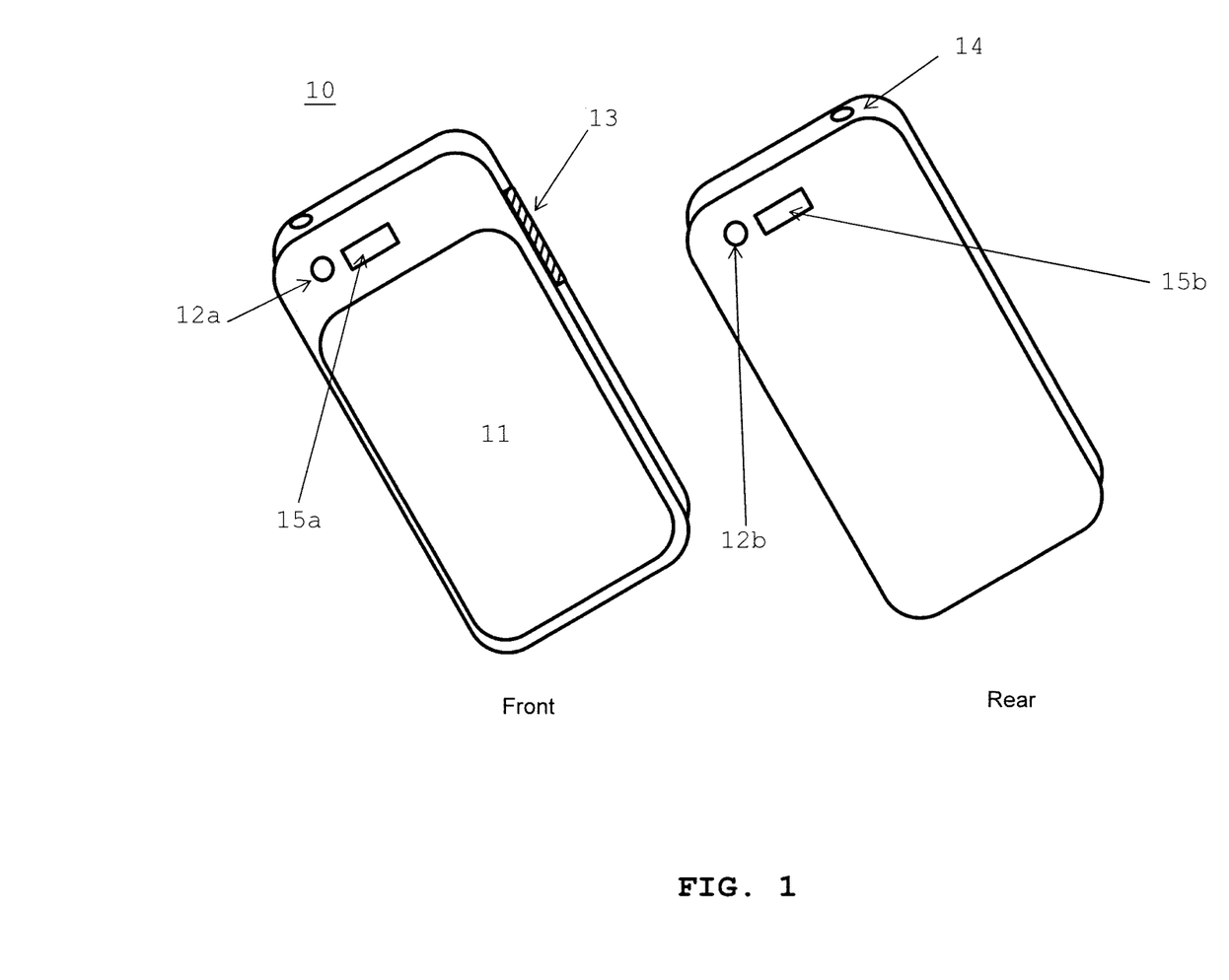
FIG. 1 shows an example of a mobile terminal according to an embodiment.

FIG. 1 shows an example of a mobile terminal according to a first embodiment. In the embodiment, the mobile terminal is a smartphone 10. However, the embodiment is also applicable to other mobile terminals such as a tablet computer, a laptop computer or a smart watch.

The terminal 10 comprises a screen 11 on the front surface. The screen 11 may be any conventional and commercially available screen suitable for use with a mobile terminal. A first distal lens 12a is disposed on the front surface towards the top edge of the terminal 10. The first distal lens 12a is mounted to the front surface of the terminal 10 through a carriage (not shown) that allows controlled movement of the first distal lens 12a. A control 13 is provided on one side of the terminal 10 for controlling the movement of the distal lens 12a. The control 13 may be provided, for example, in the form of a slider or wheel, that mechanically control the movement and/or rotation of the distal lens 12a via a mechanical connection. Alternatively, the control 13 may be electrically connected to the carriage and the movement and/or rotation of the distal lens 12a is electrically controlled.

In the embodiment, the terminal 10 further comprises a second distal lens 12b disposed on the rear surface. The second distal lens 12b is similarly mounted to the rear surface of the terminal 10 through a carriage (not shown). The second distal lens 12b may be controlled using the same control 13, for example by providing a switch (not shown) to the terminal 10 that switches control between the first distal lens 12a and the second distal lens 12b. Alternatively, a separate control (not shown) may be provided to the second distal lens 12b. Flash 15a is provided on the front surface of the terminal 10 adjacent the first distal lens 12a to provide additional light for image capturing in low light conditions. Similarly, flash 15b is provided on the rear surface of the terminal adjacent the second distal lens 12b.

Figure 2:
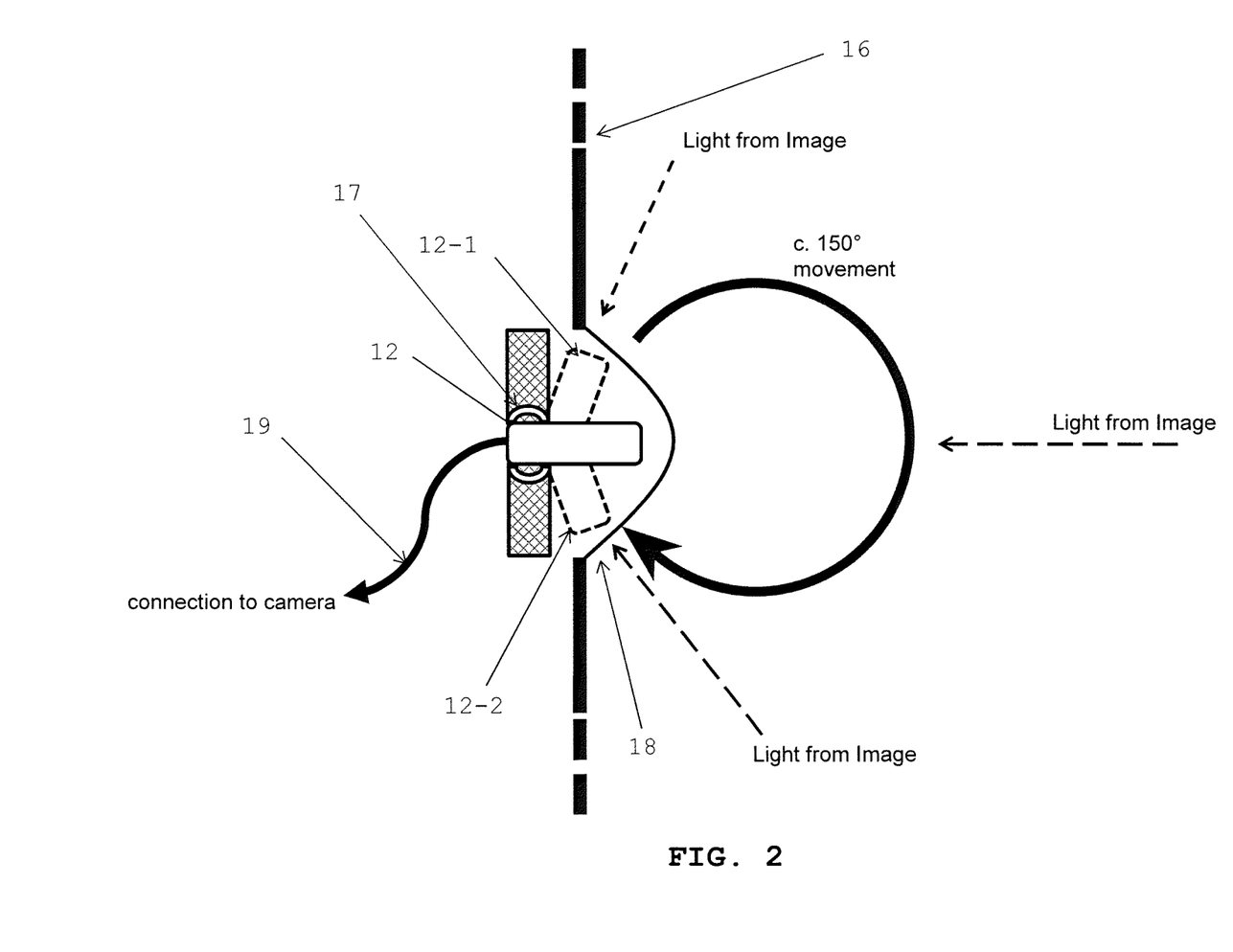
FIG. 2 shows a top view of the mobile terminal of FIG. 1.

FIG. 2 shows a top view of the mobile terminal 10. A distal lens 12 is shown disposed on a surface 16 of the terminal 10. The distal lens 12 may either be the first distal lens 12a or the second distal lens 12b. The distal lens 12 is mounted on the terminal 10 through a carriage 17, which is configured to enable rotational motion of the distal lens through approximately 150 degrees in every direction, or from 15 to 165 degrees with respect to the surface 16. Dash lines 12-1 and 12-2 show two extreme positions of the distal lens 12 when it is positioned at 15 degrees with respect to the surface 16.

As can be seen from FIG. 2, by rotating and positioning the distal lens 12 between the positions 12-1 and 12-2, the distal lens 12, and therefore the camera (not shown), is able to receive light from a wide range of angles.

In the present embodiment, the distal lens 12 is protected by a cover 18 from, for example, dust, moisture, impact, etc. The cover 18 may be made from any suitable material such as plastic, rubber, silicon, etc. Preferably, the cover 18 is made from a substantially transparent material.

The distal lens 12 is connected to a camera (not shown) via an optical fibre connection 19. In other embodiments, connection 19 may be other types of connection such as an electrical or digital connection. However, as optical fibre cables do not require any electrical components, there is no wear and tear of electrical connections through stress as a result of frequent movement of the distal lens 12. The use of optical fibre cables provide the required flexibility for the movement of the distal lens 12. The cable may be articulated or jointed to support the flexibility for movement, or be made of flexible material such as natural or synthetic rubber. In the present embodiment, connection 19 comprises one or more small diameter, high bandwidth optical fibre cables (e.g. Corning's Clearcurve).

In the present embodiment, each of the first distal lens 12a and the second distal lens 12b is provided with a respective connection 19, connecting both the first and second distal lenses 12a and 12b to a single digital camera. Although a single digital camera is used in the present embodiment, more than one camera may be provided if desired.

One or more electrically switchable reflective devices (not shown) are provided to electrically control the light source to the digital camera. More specifically, an electrically switchable device (not shown) may be provided at the digital camera to electrically switch the light source received by the camera between the optical fibre connection leading to the first distal lens 12a or the optical fibre connection leading to the second distal lens 12b.

Such electrically switchable reflective devices are available commercially, which are capable of rapid switching at a rate of 10-100 milliseconds between two sources. The electrically switchable reflective device may be controlled by software, such as an app on the terminal 10, or by hardware, such as a button built into the terminal 10.

According to the present embodiment, the distal lens 12 can be rotated to point in different directions within the range of positions 12-1 to 12-2. The movement is independent of the camera to which the distal lens connects, and therefore independently of the orientation of the mobile terminal 10. It is therefore possible to capture images in discrete and/or at an angle to the plane of the terminal 10. For example, when a user is capturing images above his/her head, e.g. over the heads of a crowd, it is possible for the user to gain a clear line of sight at a subject while continuously monitoring the image on the screen for image management and/or capture control, by pointing the distal lens 12 towards the subject with the terminal 10 tilted at such an angle that the screen 11 faces the user. The present embodiment moreover enables the user to capture an image of him/herself at different angles without the need to orientate the terminal 10 by simply rotating the distal lens 12a. In video mode, when capturing moving images, panning can be performed by rotating the distal lens 12, for example from position 12-1 to position 12-2, without the need to move the terminal 10. This in turn allows the terminal to be placed on a tripod or stabilised, e.g. against a wall, a book or other solid object, to achieve better results.

According to the present embodiment, there is no requirement for the single digital camera to be placed at any specific position or orientation on the terminal 10. The camera may therefore be placed within the terminal 10 if desired. In particular, the camera may be mounted perpendicular to the plane of the terminal 10 (surface 16) within the terminal 10. This allows additional devices and accessories (such as lenses and filters) to be disposed near the camera to provide additional functions. Moreover, compared to terminals where separate cameras must be provided on the front and rear surfaces of the terminals to provide both front-facing and rear-facing image capture capability, manufacturing costs can be kept low even if a high quality (resolution) camera is used, as only a single camera is required.

Further embodiments are anticipated in which one or both of the distal lenses 12a and 12b are detachably mounted on the carriage 17, such that the distal lens 12 can be pulled out of the carriage 17. In the further embodiments, the connection 19 is configured to be extendable, for example by providing extra length within the body of the terminal 10, such that the distal lens, when detached, can be extended from the terminal 10. The connection 19 may be configured to be retractable such that the distal lens 12 can be conveniently returned to the carriage 17.

In another aspect, embodiments of the present invention provide a method of determining a distance using a mobile terminal. The mobile terminal comprises first and second distal lenses disposed spaced apart by a predetermined distance on the same surface of the mobile terminal. The first and second distal lenses are each connected to a camera by a respective connecting means, e.g. an optical fibre. The method comprises capturing, by the camera, a first image of an object from the first distal lens; capturing, by the camera, a second image of the object from the second distal lens; comparing the first image with the second image; and determining a distance in relation to the object based on a result of comparing the first image with the second image using the predetermined distance between the first and second distal lenses.

In another aspect, embodiments of the present invention provide a mobile terminal comprising a camera configured to capture an image; first and second distal lenses disposed spaced apart by a predetermined distance on the same surface of the mobile terminal; connecting means provided to each of the first and second distal lenses, the connecting means connecting each distal lens to the camera and configured to direct light from each distal lens to the camera; and processing means configured to compare an image of an object captured via the first distal lens with an image of the object captured via the second distal lens, and determine a distance in relation to the object based on the comparison using the predetermined distance.

In further embodiments, two distal lenses separated by a predetermined, known, distance are provided on the same surface of the mobile terminal. Each distal lens is connected to a single camera such that an image can be taken by the mobile terminal from two different viewpoints using only one camera. Each image captured from each distal lens correspond to a different line of sight from the mobile terminal to an object that is the focus of the image. The object therefore would appear to have shifted with respect to the second image when compared to the first image. Comparing the first image with the second image provides information of the difference in the two lines of sight, and with the known predetermined distance between the two distal lenses, thus the distance separating the two lines of sight, it is possible to determine a distance in relation to the object, for example a range between the mobile terminal (thus the user) to the object, and/or a dimension of the object. Preferred embodiments therefore enable a user to determine a distance in relation to an object that does not rely on the availability of a third-party service such as GPS, in a way that is inexpensive and easily portable.

Figure 3:
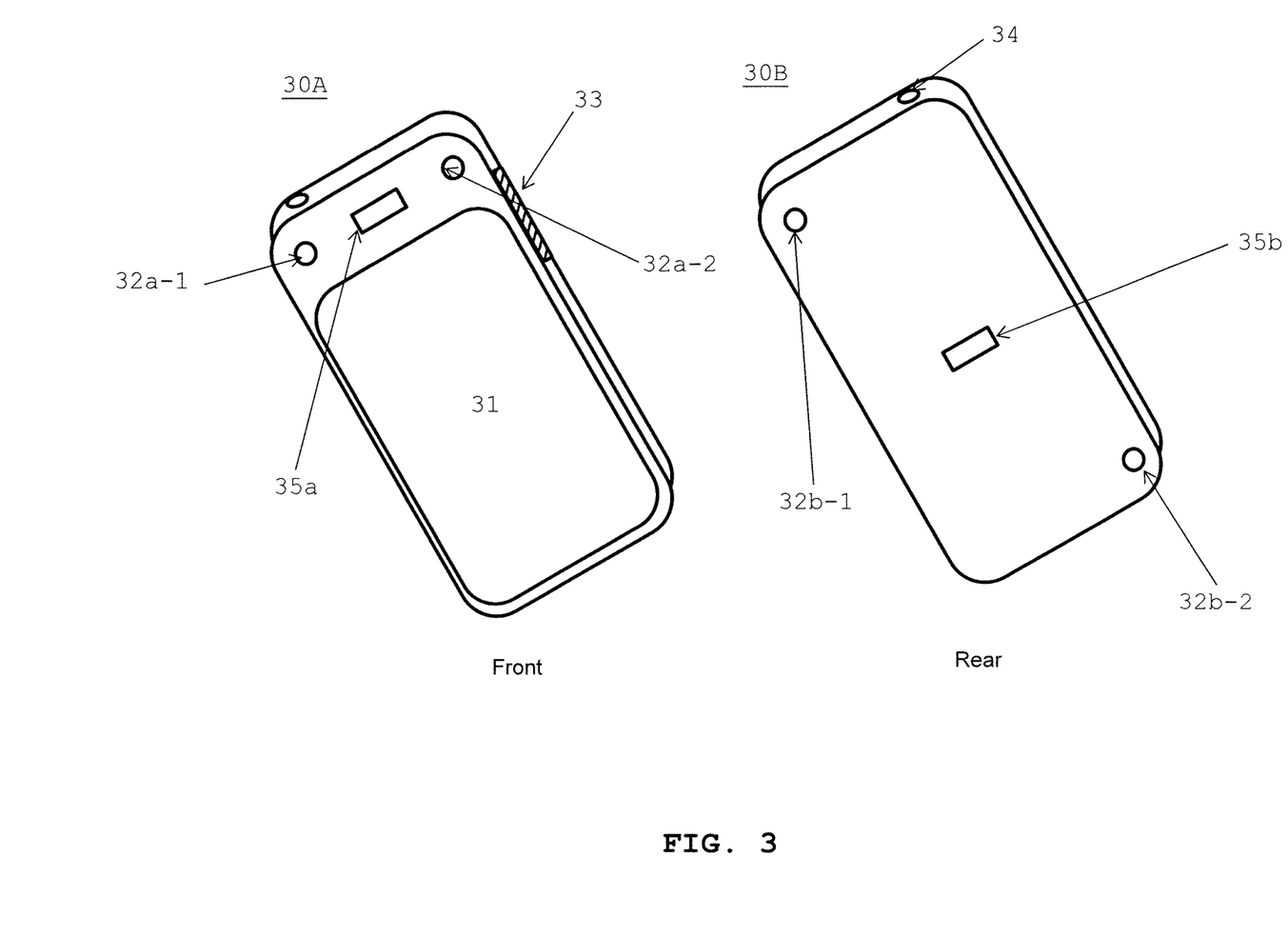
FIG. 3 shows two alternative examples of a mobile terminal according to embodiments of the present disclosure.

FIG. 3 shows an example of a mobile terminal according to a second embodiment. In the embodiment, the mobile terminal is a smartphone 30A. However, the embodiment is also applicable to other mobile terminals such as a tablet computer, a laptop computer, a smart watch, or any other suitable mobile devices.

The terminal 30A comprises a screen 31 on the front surface. The screen 31 may be any conventional and commercially available screen suitable for use with a mobile terminal. The terminal 30A of the second embodiment differs from the terminal 10 of the first embodiment in that two distal lenses are provided on the front surface of the terminal 30A.

In particular, a first distal lens 32a-1 is disposed on the front surface at the top left corner of the terminal 30A, and a second distal lens 32a-2 is disposed on the front surface at the top right corner of the terminal 30A. The first and second distal lenses 32a-1 and 32a-2 is mounted to the front surface of the terminal 30A. Preferably, the first and second distal lenses 32a-1 and 32a-2 are fixedly mounted to the front surface. However, in some embodiments, it may be desirable to mount the first and/or second distal lenses 32a-1 and 32a-2 through a respective carriage (not shown) that allows controlled movement of the first and second distal lenses 32a-1 and 32a-2 and allows the distal lenses 32a-1 and 32a-2 to be locked in place such that the lines of sight of both lenses 32a-1 and 32a-2 are parallel (both lenses point in the same direction. Where the first and second distal lenses 32a-1 and 32a-2 are movably mounted, a control 33 may be provided on one side of the terminal 30A for controlling the movement of the distal lenses 32a-1 and 32a-2. Flash 35a is provided on the front surface of the terminal 30A between the first and second distal lenses 32a-1 and 32a-2 to provide additional light for image capturing in low light conditions.

An alternative embodiment is also shown in FIG. 3, where a terminal 30B comprises a first distal lens 32b-1 and second distal lens 32b-2 disposed on the rear surface at diagonal corners of the terminal 30B. The first and second distal lenses 32b-1 and 32b-2 are similarly fixedly mounted to the rear surface of the terminal 30B. Similarly, flash 35b is provided on the rear surface of the terminal 30B between the first and second distal lenses 32b-1 and 32b-2.

Other embodiments have been contemplated in which more than two distal lenses are provided on a surface of a mobile terminal, or multiple surfaces, e.g. both front and rear, of the mobile terminal. Further embodiments have been contemplated in which multiple cameras (instead of or in addition to multiple lenses) are provided on a surface (or multiple surfaces) of a mobile terminal. Combinations of multiple distal lenses and multiple cameras on one or more surfaces of a mobile terminal are also contemplated.

Each of the distal lenses 32a-1, 32a-2, 32b-1 and 32b-2 is connected to a single camera (not shown) via a connecting means such as an optical fibre. In other embodiments, the connecting means may comprise other types of connection such as an electrical or digital connection. Using optical fibre cables has the advantage that they do not require any electrical components, such that the cables do not suffer wear and tear of electrical connections through stress as a result of frequent movement of the distal lens. The use of optical fibre cables may also provide flexibility for the movement of the distal lens if desired. The cable may be articulated or jointed to support the flexibility for movement, or be made of flexible material such as natural or synthetic rubber. In the present embodiment, the connecting means may comprise one or more small diameter, high bandwidth optical fibre cables (e.g. Corning's Clearcurve®).

According to the embodiments, where two or more distal lenses are used, there is no requirement for the single digital camera, to which the two or more distal lenses are connected via a respective optical fibre cable, to be placed at any specific position or orientation on the terminal. The camera may therefore be placed within the terminal if desired. In particular, the camera may be mounted perpendicular to the plane of the terminal within the terminal. This allows additional devices and accessories to be disposed within the terminal to provide additional functions.

In further embodiments, additional devices and accessories may be provided within the terminal and may include various lenses and filters (e.g. to achieve different resolutions and/or effects). The additional devices and accessories may be disposed adjacent the camera or remotely from the camera, and may be connected to one or more distal lenses and the camera by means of one or more optical fibres. According to the further embodiments, a user may select one or more different lenses and/or filters to achieve the desired result. For example, the user may achieve a desired resolution through selecting a suitable lens, or the user may achieve a desired result through combining a plurality of images each obtained by directing light from a distal lens through a different lens by means of a respective electrically switchable reflective device.

Further embodiments have been contemplated in which one or each of the optical fibre cables may be unbundled and divided into individual, or multiple groups of, component optical fibres. Each group of the unbundled optical fibres that makes up the cable may be fed to a respective component of an image sensor array. According to the present embodiments, light received at a distal lens is transmitted along each group of unbundled optical fibres to the respective component of the image sensor array, and the final composite digital image may be formed by combining the input received at each component of the image sensor array. Through the present embodiments, it is possible to configure an image sensor array by arranging component image sensors in configurations other than the conventional square or rectangular arrangements, e.g. in a narrow strip, thus enabling greater flexibility for the location of the image sensor array within the mobile terminal and imposes less limitation on the size and shape of the terminal.

Figure 4:
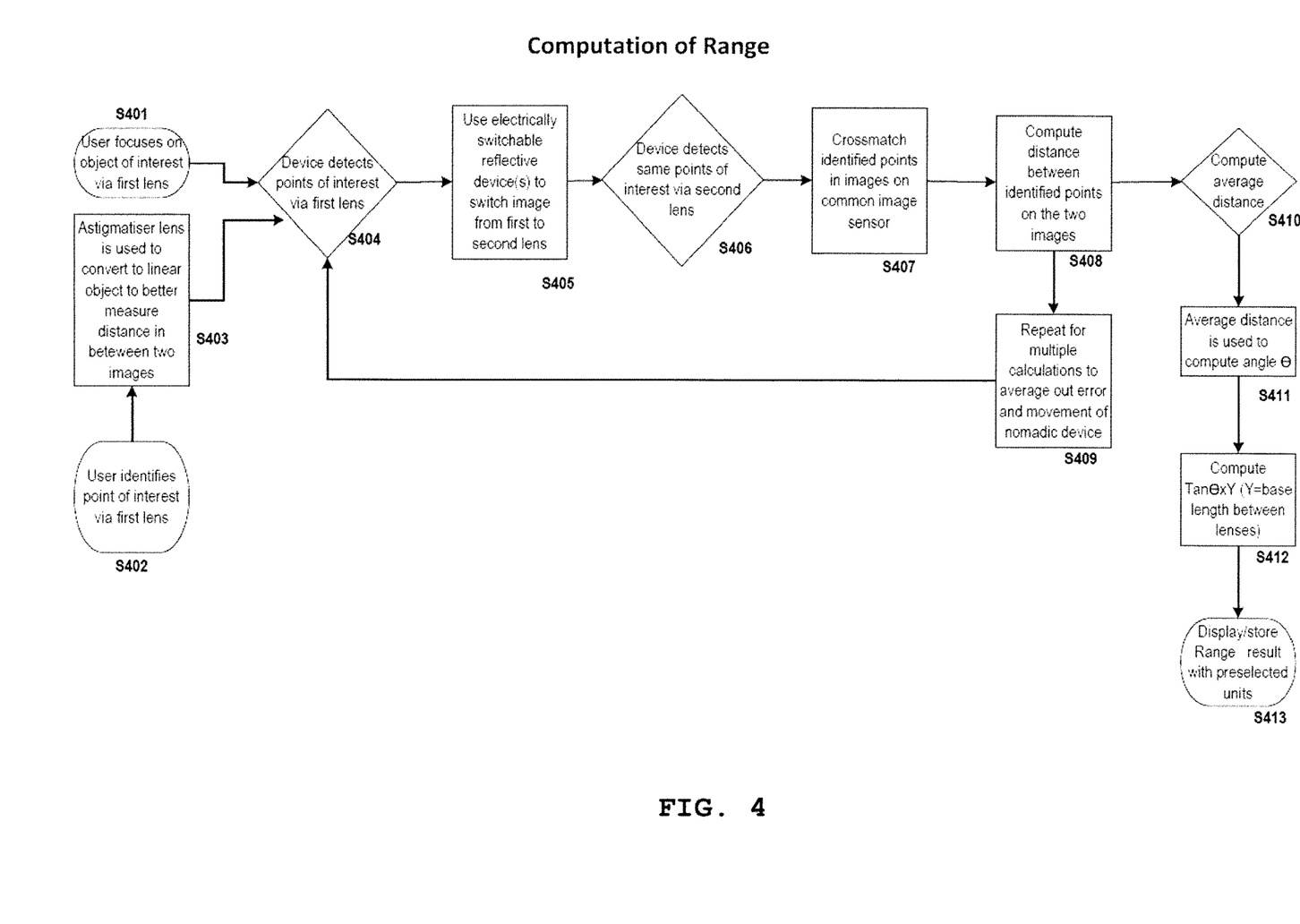
FIG. 4 shows a flow diagram of an example method of determining a distance according to an embodiment.

FIG. 4 shows a flow diagram of a method of determining a range of an object according to an embodiment. In the embodiment, a mobile terminal, such as the mobile terminal 30A or 30B, comprising a first distal lens and a second distal lens connected to a single camera via a respective optical fibre cable, is used. The first and second distal lenses are provided on the same surface of the mobile terminal, separated by a base length Y.

At block S401, a user adjusts the camera setting to focus the camera on an object through the first distal lens. At block S402, the user selects or identifies one or more points of interest on the object in an image captured through the first distal lens (first image) for use as one or more reference points. Optionally, at block S403, an astigmatiser lens is preferably provided to the mobile terminal, which is used to convert the or each reference point into a line. This then allows distance measurements with respect to the reference point to be made more accurately.

The method proceeds to block S404, when (the processing means of) the mobile terminal detects or identifies the one or more reference points from the first image obtained through the first distal lens.

In preferred embodiments, an electrically switchable reflective device may be provided to the mobile terminal, which is used to switch the input to the camera between the first distal lens and the second distal lens. At block S405, the electrically switchable reflective device is used to select the second distal lens to obtain an image through the second distal lens (second image). The processing means of the mobile terminal then detects or identifies the one or more reference points selected at block S202 in the second image at block S406. Optionally, the one or more reference points detected or identified in the second image may similarly be converted into respective lines using the astigmatiser. At block S407, the thus identified one or more reference points in the second image are cross-matched with the corresponding one or more reference points in the first image.

The processing means then, at block S408, computes the distance (or shift) between each pair of corresponding reference points on the first and second images. The method may optionally proceed to block S409, where blocks S404 to S408 may be repeated one or more times to obtain multiple results for averaging in order to reduce the effect of systematic errors and/or movement of the mobile terminal. Blocks S404 to S408 may optionally be repeated for multiple different reference points on the first and second images. Moreover, further images may be captured via the first and second distal lenses and corresponding one or more reference points in the further images may be used for repeating blocks S404 to S408. In embodiments where more than two distal lenses are provided on the same surface, further images may be captured via each of the plurality of distal lenses and corresponding one or more reference points in the captured images may be used for repeating blocks S404 to S408. The method then proceeds to block S410 when an average distance (or shift) between corresponding reference points on the first and second images is calculated.

The average distance calculated at block S410 is used to determine an angle of convergence θ at block S411, which is the angle between a first line of sight from the first distal lens to the object and a second line of sight from the second distal lens to the object. The angle θ is then used, at block S412, to compute a range of the object (the distance between the mobile terminal and the object), using the distance calculated at block S410, the base length Y that separates the first distal lens and the second distal lens, by e.g. computing the value of Y Tan θ (Naval Ordinance and Gunnery Volume 2, Chapter 16F4, prepared by the Department of Ordnance and Gunnery United States Naval Academy, edited and produced by the Bureau of Naval Personnel NavPers 10798-A for sale by the Superintendent of Documents, U. S. Government Printing Office Washington 25, D.C., 1958 edition revised from the 1950 edition). The computed range is displayed and/or stored, at block S413 with preselected units (e.g. meter). Details of rangefinding methods have been described in literature and will not be repeated here.

Figure 5:
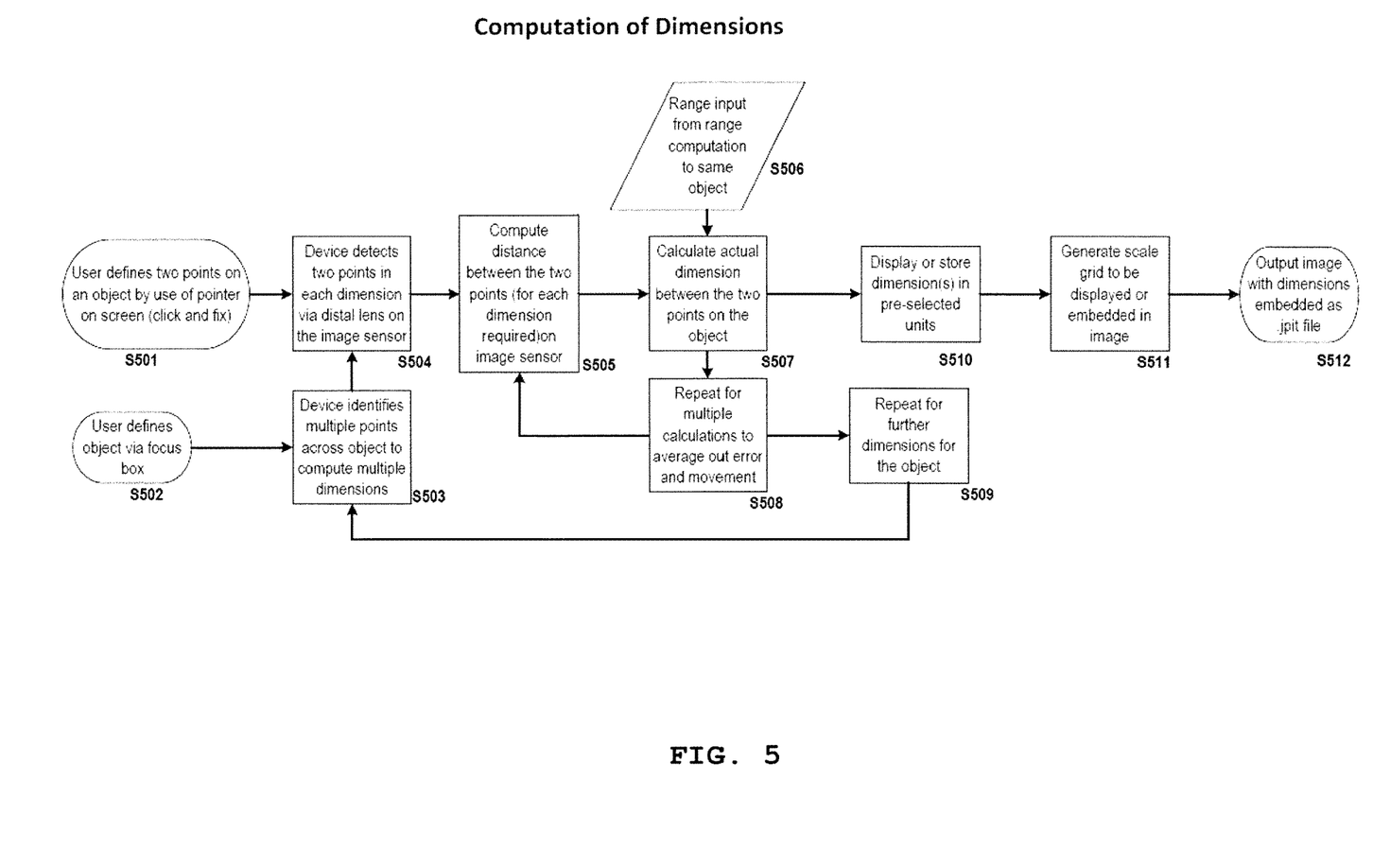
FIG. 5 shows a flow diagram of an example method of determining a dimension according to an embodiment.

FIG. 5 shows a flow diagram of a method of determining a dimension of an object according to an embodiment.

At block S501, the user selects or defines a first point and a second point on an object on the screen of a mobile terminal. The selection may, for example, be performed using a pointer to select a point on the object and clicking on the point to confirm.

Alternatively or optionally, at block S502, the user selects or defines the object (the dimension of which is to be determined) on screen by, for example, using a focus box. Then, at block S503, the terminal (or the processing means of the terminal) identifies two or more points on the object for determining one or more dimensions of the object.

At block S504, the processing means detects the first and second points on an image captured through one of the first or second distal lenses, based on the points defined at block S501 or identified at block S503.

At block S505, the difference (or separation) between the first and second points on the image is determined. A range of the object (the distance between the object and the mobile terminal) is obtained using, for example, the range determination method described above, and the range is input at block S506. Other methods may alternatively be used to obtain the range of the object for use at block S506, for example by physical measurement, determination using a map, using a database, etc. At block S507, the dimension of the object is determined using the difference or separation determined at block S505 and the range input at block S506, for example using a trigonometric method. This step may be repeated, at block S508, e.g. for further images obtained via the same lens or the other lens, to obtain multiple results for averaging in order to reduce the effect of systematic errors and movement of the mobile terminal. Additionally or alternatively, at block S509, the calculation is repeated to obtain other dimension(s) of the object (e.g. width and height) using other points identified on the object.

The determined dimension(s) can then be displayed and/or stored, at block S510, in preselected units (e.g. meters). At block S511, the determined dimension(s) is used to generate a scale grid of the object that can be displayed, superimposed on the object, or embedded in the image file of the object, e.g. for storage or sharing. At block S512, the image file with embedded scale grid is output in a predetermined file format. According to the present embodiment, the predetermined file format allows the scale grid to be resized in direct proportion with the object when the image is being resized (e.g. by zooming in or out).

Specific implementation examples using embodiments of the present invention have been contemplated, which will be described below. It should be understood that the examples described below are for illustration purposes only and are non-exhaustive.

E-Commerce Applications

Embodiments of the present disclosure may be used in e-commerce applications, for example, custom fitting apps are anticipated for clothing retailers.

In the present example, a customer may create an image of his/her body or a part of the body with an embedded scale grid as described above. The created image may be stored on the customer's mobile terminal and/or sent to a retailer for fitting. In preferred embodiments, the retailer may provide an app on its website that can be downloaded to the customer's mobile terminal for receiving image files of different sizes of a garment with embedded scale grid. The app can then manipulate the customer's stored image file to generate a composite image file (e.g. a garment superimposed on the customer's body image) to enable custom fitting.

The standards for such a collaboration between the customer's mobile terminal and the retailer's app may be controlled by the operating system (OS) of the manufacturer of the mobile terminal and any suitable file format interchange standards, thus a commercial arrangement for the use of the customer's image files by the retailer may be negotiated.

The present embodiment allows the customer to visualise how a garment and other accessories may look on them and how different sizes may fit. This increases the likelihood of the customer purchasing the item. Moreover, the customer is more likely to order the correct size, thus reducing time and resources that would otherwise be wasted (and possible damage) when multiple sizes of an item are ordered and delivered, many of which are subsequently returned.

Custom 3D Printing/Manufacturing

Embodiments of the present disclosure may be applied to custom 3D printing manufacturing, to provide custom-made products unique to customer requirements.

An example of this may be the custom production of earphone/plugs. Custom production currently requires multiple visits to a location where measurements are made and then, fitting must be done when the product is shipped to the location.

In this application, accurate measurement of the dimensions of an object is required. It is anticipated that a customer uses a mobile terminal to create an image file or series of image files with embedded scale grid of an object to be made, or an object for which a product is to be made to fit, for example custom-made ear plugs or ear phones. The image file may be uploaded to the manufacturer's website, where image recognition software may create a 3D image (or mirror image), based on the embedded dimensions of the object, to generate a file to be sent to a 3D printing device (in scale). The custom produced product may then be packaged and shipped to the customer without the need for the customer to be physically present for measurements.

According to the present embodiment, the customer may create one or more image files with embedded scale grid as described above, and upload the image files to the manufacturer's website, where a 3D image of each ear is generated and then earplug mapped to the thus generated 3D image. Instructions for producing the mapped earplug may then be passed to a 3D printer for both left and then right ears. Colour/patterns may also be customised by the customer if desired. The earplugs may be a carrier for Bluetooth speakers or other communications devices, or a noise reduction device.

3D Images

Further embodiments have been contemplated in which input to the camera may be rapidly (electrically) switched between the two (or more if desired) distal lenses, provided on the same surface of the mobile terminal, to generate stereoscopic images. The present embodiments make use of the slight difference in the line of sight from an object to each of the two distal lenses, which are separated by a predetermined distance, to generate a stereoscopic image of the object on screen that the user may perceive as three-dimensional. The generated 3D image(s) may be stored, manipulated and/or shared with third parties as desired.

Remote Diagnostics

According to preferred embodiments, an image of an object may be stored with an embedded scale grid in a predetermined file format, where the embedded scale grid resizes in direct proportion with the object such that the dimension of the object may be read from the scale grid. Thus, further embodiments have been contemplated in which a stored image file of e.g. a body part, may be sent to a third party, e.g. a medical expert, for determination of one or more dimensions with respect to the body part, e.g. a wound.

According to present embodiments, it is possible for the medical expert at a remote location to perform initial assessment of, for example, the seriousness of an injury, to determine appropriate treatment for the injury.

Biometric

Further embodiments have been contemplated in which biometric dimensions may be determined from, e.g. images of fingerprint, facial features, etc., in addition to pattern recognition to enhance the accuracy and security of biometric identification systems.

Determination of Speed and Acceleration

Further embodiments have been contemplated in which a sequence of images of an object moving relative to the mobile terminal may be captured. This may include cases in which the user is on the move (e.g. in a moving vehicle), the object is moving, and both the user and the object are moving relative to each other. Each image of the sequence may be time-stamped. The time difference between each pair of images may be determined, and the range of the object may be obtained according to embodiments of the rangefinding method described above for each image of the sequence, to compute the speed at which the object moves relative to the user. If desired, the acceleration of the object relative to the user may also be computed by determining a sequence of speed using the sequence of images.

Autonomous Machine Range Determination

Further embodiments have been contemplated in which the distance from an autonomous machine, such as a driverless vehicle, to a vehicle, pedestrian or other objects in the line of sight may be determined from images taken using embodiments described above embedded or otherwise in communication with an autonomous machine, according to embodiments of the rangefinding method described above.

Although the present invention has been described with reference to preferred embodiments, it will be understood by those skilled in the art that various changes in form and detail may be made without departing from the scope of the invention as set forth in the accompanying claims.

The invention claimed is:

1. A mobile terminal comprising:
a camera configured to capture an image;
a first distal lens and a second distal lens disposed remotely from the camera;
a first optical fibre connecting the first distal lens to the camera configured to direct light from the first distal lens to the camera, and a second optical fibre connecting the second distal lens to the camera configured to direct light from the second distal lens to the camera, wherein the first and second optical fibres are arranged to allow the first and second distal lenses to move independently with respect to the camera, and
a device disposed at each of the first and second lenses configured to switch an input to the camera between the first distal lens and the second distal lens.

2. The mobile terminal according to claim 1, wherein at least a part of the first and second optical fibres is articulated and/or flexible.

3. The mobile terminal according to claim 1, further comprising a controller configured to control the movement of the at least one distal lens.

4. The mobile terminal according to claim 1, wherein the first distal lens is disposed on a first surface of the mobile terminal and the second distal lens is disposed on a second surface of the mobile terminal.

5. The mobile terminal according to claim 1, wherein the device controls the source of light electronically.

6. The mobile terminal according to claim 1, wherein the camera is disposed within the body of the mobile terminal.

7. The mobile terminal according to claim 1, wherein at least one of the first and second distal lens is detachably mounted on the mobile terminal, and at least one of the first and second optical fibres is extendable to allow the at least one of the first and second distal lens to be extended from the mobile terminal.

8. A method of determining a distance using a mobile terminal that comprises a first and a second distal lenses disposed spaced apart by a predetermined distance on the same surface of the mobile terminal, the first and second distal lenses being connected to a camera, the method comprising:
capturing, by the camera, a first image of an object from the first distal lens;
capturing, by the camera, a second image of the object from the second distal lens;
comparing the first image with the second image; and
determining a distance in relation to the object based on a result of comparing the first image with the second image using the predetermined distance by determining an angle of convergence between the first image and the second image, the angle of convergence being an angle between a first line of sight to the object with respect to the first distal lens and a second line of sight to the object with respect to the second distal lens, determining a range from the mobile terminal to the object using the predetermined distance and the angle of convergence, and determining a dimension of the object based on the determined range from the mobile terminal to the object;
wherein determining the dimension of the object comprises:
selecting, in one of the first image or the second image, a first point on the object and a second point on the object spaced from the first point;
determining a difference between the first point and the second point within the first or second image; and
determining the dimension of the object based on the determined difference between the first point and the second point.

9. The method of determining a distance according to claim 8, further comprising:
selecting a reference point on the object in the first image; and
identifying the reference point on the object in the second image,
wherein comparing the first image with the second image comprises detecting a difference between a first position of the reference point within the first image and a second position of the reference point within the second image.

10. The method of determining a distance according to claim 9, wherein the angle of convergence is determined using the detected difference between the first position and the second position.

11. The method of determining a distance according to claim 8, wherein determining a distance in relation to the object further comprises:
determining a second range from the mobile terminal to the object using the predetermined distance and a second angle of convergence determined by comparing a third image of an object captured by the camera from the first distal lens with a fourth image of the object captured by the camera from the second distal lens; and
averaging the range and the second range.

12. The method of determining a distance according to claim 8, wherein determining a distance in relation to the object further comprises determining a second dimension of the object based on the determined range from the mobile terminal to the object.

13. The method of determining a distance according to claim 12, wherein determining the second dimension of the object comprises:
selecting, in one of the first image or the second image, a third point on the object and a fourth point on the object spaced from the third point;
determining a difference between the third point and the fourth point within the first or second image; and
determining the second dimension of the object based on the determined difference between the third point and the fourth point.

14. The method of determining a distance according to claim 8, further comprising generating a scale grid based on the determined dimension of the object.

15. The method of determining a distance according to claim 14, further comprising embedding the generated scale grid in the first image or the second image.

16. The method of determining a distance according to claim 15, further comprising storing the first image or the second image with the embedded scale grid in a predetermined format.

17. The method of determining a distance according to claim 14, further comprising displaying, on a screen of the mobile terminal, the generated scale grid superimposed on the first image or the second image.

18. A mobile terminal comprising:
a camera configured to capture an image;
first and second distal lenses disposed spaced apart by a predetermined distance on the same surface of the mobile terminal;
wherein each distal lens is connected to the camera such that light from each distal lens can be directed to the camera; and a processor configured to perform a method of determining a distance according to claim 8, the selecting being performed by the processor or manually by a user of the mobile terminal.

\* \* \* \* \*